United States Patent
Lin et al.

(10) Patent No.: US 9,786,441 B2
(45) Date of Patent: Oct. 10, 2017

(54) SOLID ELECTROLYTIC CAPACITOR PACKAGE STRUCTURE AND METHOD OF MANUFACTURING THE SAME

(71) Applicant: APAQ TECHNOLOGY CO., LTD., Miaoli County (TW)

(72) Inventors: Ching-Feng Lin, Hsinchu County (TW); Liang-Min Kao, Yunlin County (TW); Chun-Chia Huang, Tainan County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 22 days.

(21) Appl. No.: 15/147,120

(22) Filed: May 5, 2016

(65) Prior Publication Data

US 2017/0110256 A1    Apr. 20, 2017

(30) Foreign Application Priority Data

Oct. 14, 2015   (TW) .............................. 104133685 A

(51) Int. Cl.
| | |
|---|---|
| *H01G 9/10* | (2006.01) |
| *H01G 9/15* | (2006.01) |
| *H01G 9/26* | (2006.01) |
| *H01G 9/012* | (2006.01) |
| *H01G 9/14* | (2006.01) |

(52) U.S. Cl.
CPC ............... *H01G 9/10* (2013.01); *H01G 9/012* (2013.01); *H01G 9/14* (2013.01); *H01G 9/15* (2013.01); *H01G 9/26* (2013.01)

(58) Field of Classification Search
None
See application file for complete search history.

(56) References Cited

U.S. PATENT DOCUMENTS

| | | | | |
|---|---|---|---|---|
| 6,229,687 B1 * | 5/2001 | Wada | ...................... | H01G 9/012 361/523 |
| 2010/0265634 A1 * | 10/2010 | Freeman | ................ | H01G 9/012 361/529 |

(Continued)

*Primary Examiner* — Dion R Ferguson
(74) *Attorney, Agent, or Firm* — Li & Cai Intellectual Property (USA) Office

(57) ABSTRACT

The instant disclosure provides a solid electrolytic capacitor package structure and method of manufacturing the same. The solid electrolytic capacitor package structure includes a capacitor assembly, at least one electrode pin and a package body enclosing the capacitor assembly and the electrode pin. The electrode pin includes an embedded portion enclosed by the package body and an exposed portion positioned outside the package body. The method of manufacturing the solid electrolytic capacitor package structure includes a protection step including forming a protecting film on the exposed portion; a coating step including depositing a nanomaterial on the solid electrolytic capacitor package structure to form a nanofilm, wherein the nanomaterial penetrates into defects of the solid electrolytic capacitor package structure; and a deprotection step including removing the protecting film. The instant disclosure provides improved air-tight and water-tight properties of the solid electrolytic capacitor package structure, thereby increasing the lifetime thereof.

10 Claims, 7 Drawing Sheets

(56) References Cited

U.S. PATENT DOCUMENTS

| | | | | |
|---|---|---|---|---|
| 2011/0045327 A1* | 2/2011 | Yawata | .................. | H01G 9/016 |
| | | | | 429/82 |
| 2013/0050904 A1* | 2/2013 | Nemoto | ................... | H01G 9/04 |
| | | | | 361/528 |
| 2014/0061284 A1* | 3/2014 | Hussey | .................. | H01G 13/00 |
| | | | | 228/176 |
| 2014/0252342 A1* | 9/2014 | Ramadas | ................ | H01L 21/56 |
| | | | | 257/40 |
| 2015/0077900 A1* | 3/2015 | Petrzilek | ............. | H01G 9/0029 |
| | | | | 361/504 |

* cited by examiner

SOLID ELECTROLYTIC CAPACITOR PACKAGE STRUCTURE AND METHOD OF MANUFACTURING THE SAME

BACKGROUND

1. Technical Field

The instant disclosure relates to a solid electrolytic capacitor package structure and method of manufacturing the same, in particular, to a solid electrolytic capacitor package structure for electronic products and method of manufacturing the same.

2. Description of Related Art

Capacitors are widely used as basic components of consumer home appliances, computer motherboards, power supplies, communication products and vehicles, etc. The main function of the capacitors include filtering, bypassing, rectifying, coupling, decoupling and phase inversing, etc., and the capacitors are essential in the electronic products. According to different materials and applications, capacitors may be characterized into various types such as aluminum electrolytic capacitors, tantalum electrolytic capacitors, multi-layer ceramic capacitors and thin film capacitors.

The existing solid electrolytic capacitor has the advantages of small size, large capacity and a good frequency property and may be used in the decoupling process of the power circuits in center processing units. As shown in FIG. 1, an existing stack solid electrolytic capacitor 100 generally comprises a plurality of capacitor units 10, each capacitor unit 10 comprises a positive portion P and a negative portion N. The negative portions N of the capacitor units 10 sequentially stacks with one another, and by arranging a conductive gel 11 between two adjacent capacitor units 10, the plurality of capacitor units 10 may electrically connect with each other and form a capacitor assembly 1. The capacitor units 10 shown in FIG. 1 are chip solid capacitors. In addition, the front end of the positive portion P of each capacitor unit 10 in the capacitor assembly 1 extends and forms the positive connecting pin 12, and the positive connecting pin 12 is bent and welded to a positive pin 13 to form an electrical connection. The negative portions N of the capacitor units 10 are connected to a negative pin 14. Generally, materials such as synthesis resins are used for enclosing the capacitor assembly 1, the positive connecting pin 12 and a part of the positive pin 13 and negative pin 14 for forming a package body 15, thereby forming a solid electrolytic capacitor package structure 100. Therefore, the positive pin 13 comprises an embedded portion 131 enclosed by the package body 15 and an exposed portion 132 outside the package body 15, and the negative pin 14 comprises an embedded portion 141 enclosed by the package body 15 and an exposed portion 142 outside the package body 15. The exposed portions 141 and 142 may be further bent to electrically connect with other components.

However, during the process of forming the package body 15, an air-tight package may not be achieved or defects or microvoids may form due to the different heat expansion coefficients between the synthetic resin and the materials of the components in the capacitor assembly 1. In particular, since a solid electrolytic capacitor package structure 100 comprising a capacitor assembly 1 formed by chip capacitors generally utilizes epoxy resin or organic compounds such as silica sands and hydrophilic materials such as alumina foils as materials, it is easy to absorb moisture thereby reducing the lifetime thereof. Therefore, it would be unable to achieve a solid electrolytic capacitor package structure with good air-tight and water-tight property, and problems such as short circuit or current leakage might occur, thereby reducing the lifetime of the solid electrolytic capacitor package structure. Accordingly, there is a need to solve the problems related to producing an air-tight solid electrolytic capacitor package structure.

SUMMARY

In view of the above problem, an embodiment of the instant disclosure provides a method for manufacturing a solid electrolytic capacitor package structure, wherein the solid electrolytic capacitor package structure comprises a capacitor assembly, at least one electrode pin electrically connected to the capacitor assembly and a package body enclosing the capacitor assembly and at least a part of the electrode pin, and the electrode pin has an embedded portion enclosed by the package body and an exposed portion positioned outside the package body. The method for manufacturing the electrolytic capacitor package structure comprises performing a pre-treatment step for forming an electrode pin protective film to enclose the exposed portion of the electrode pin; performing a coating step for forming a nanofilm penetrating and sealing a microstructure of the solid electrolytic capacitor package structure; and performing a post-treatment step for removing the electrode pin protective film.

Another embodiment of the instant disclosure provides a solid electrolytic capacitor package structure comprising a capacitor assembly, at least an electrode pin electrically connected to the capacitor assembly, a package body enclosing the capacitor assembly and at least a part of the electrode pin, and a nanofilm made from a nanomaterial, the nanofilm covers a surface of the package body. The electrode pin has an embedded portion enclosed by the package body and an exposed portion outside the package body, and the nanomaterial seals a microvoid and a microgap formed on the surface of the package body and a microgap positioned between the package body and the electrode pin.

The advantages of the instant disclosure resides in that the solid electrolytic capacitor package structure and method of manufacturing the same may achieve air-tight and water-tight effects by penetrating a nano-grade material into the microstructures generated during the manufacturing process of the solid electrolytic capacitor package structure. Therefore, the instant disclosure may effectively improve the air-tight and water-tight properties of the solid electrolytic capacitor package structure, thereby preventing problems such as short circuit or current leakage occurring during the operation of the solid electrolytic capacitor package structure. Accordingly, the solid electrolytic capacitor package structure provided by the instant disclosure exhibits improved lifetime. In addition, the nanofilm of the solid electrolytic capacitor package structure provided by the instant disclosure is formed by a coating process carried out under room temperature, and parameters such as the thickness and uniformity of the nanofilm may be accurately controlled during the coating process, and hence, the instant disclosure is adapted to capacitors having complicated shapes or surfaces such as chip capacitors. Moreover, the coating step is able to form coatings on objects having large surface area and hence, may reduce the manufacturing cost.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
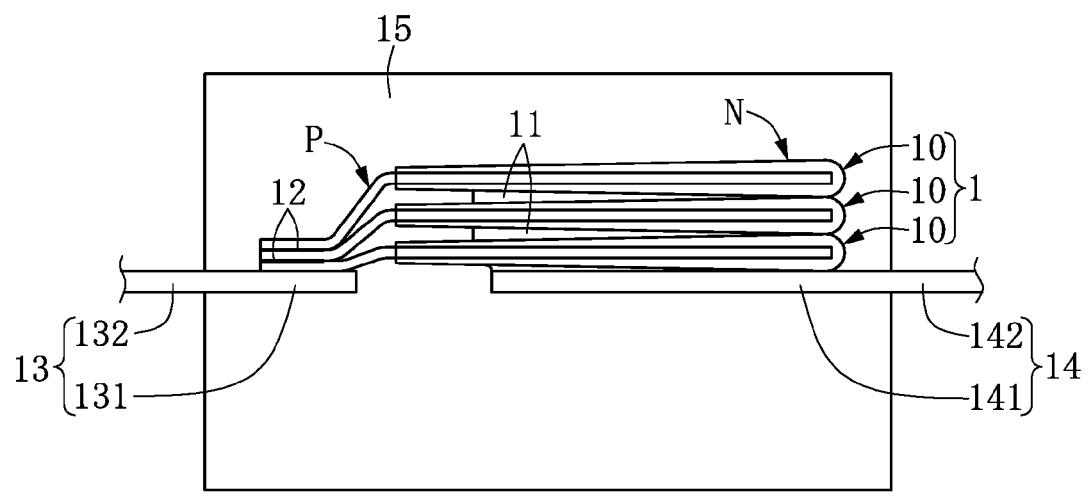
FIG. 1 is a schematic view of a prior art solid electrolytic capacitor structure.

Reference will now be made in detail to the exemplary embodiments of the instant disclosure, examples of which are illustrated in the accompanying drawings. Wherever possible, the same reference numbers are used in the drawings and the description to refer to the same or like parts.

Figure 2A:
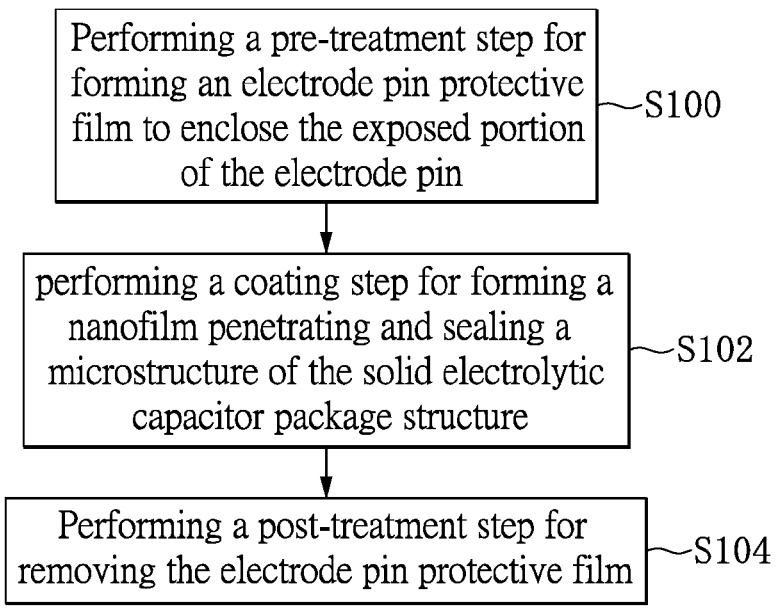
FIGS. 2A and 2B are the flow charts of the method for manufacturing a solid electrolytic capacitor package structure of the embodiment of the instant disclosure.
Figure 2B:
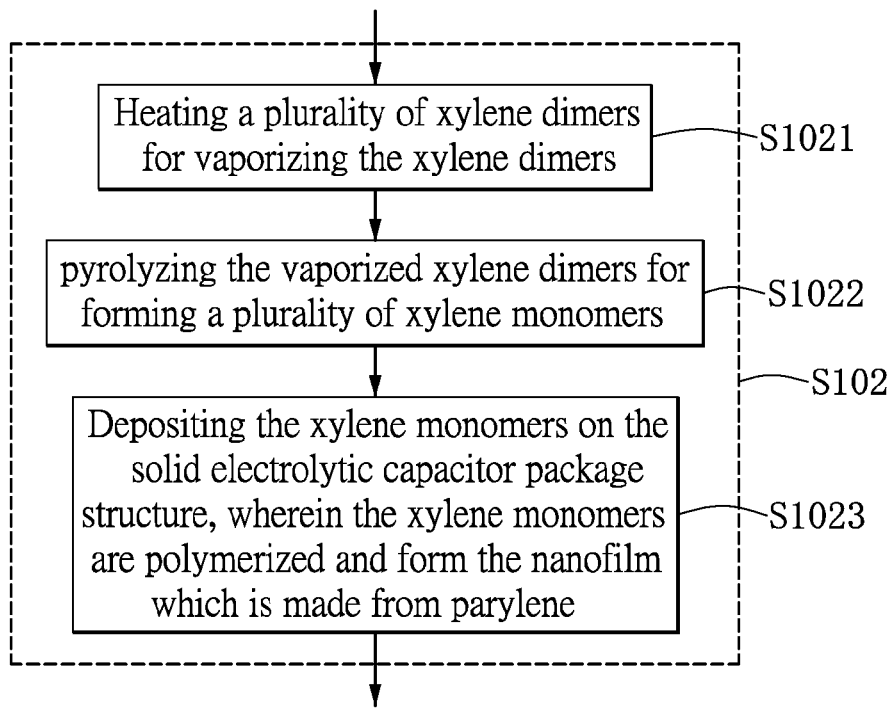
Figure 3A:
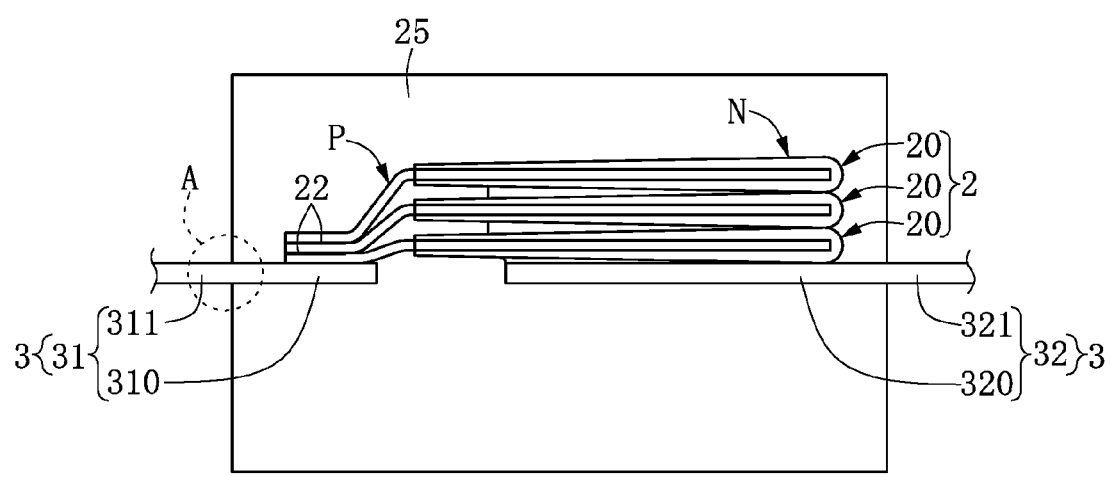
FIG. 3A to 3C are the schematic views of the solid electrolytic capacitor package structure under different stages during the method for manufacturing a solid electrolytic capacitor package structure of the embodiment of the instant disclosure.
Figure 3B:
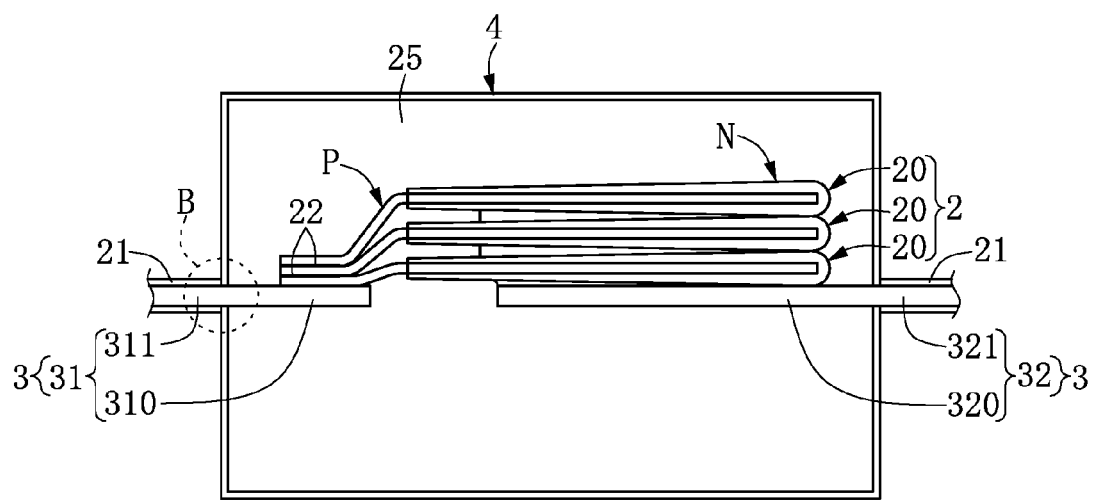
Figure 3C:
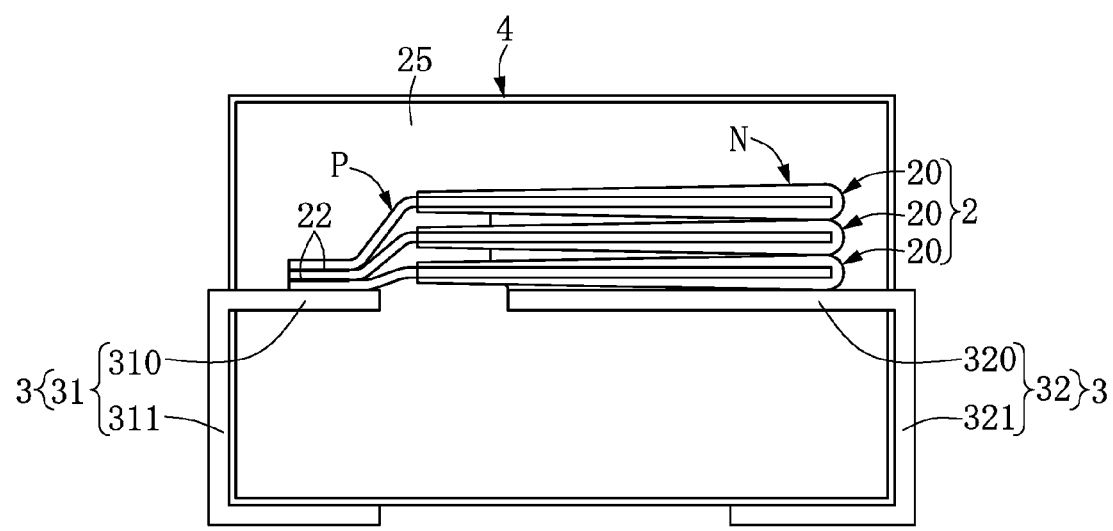
Figure 4A:
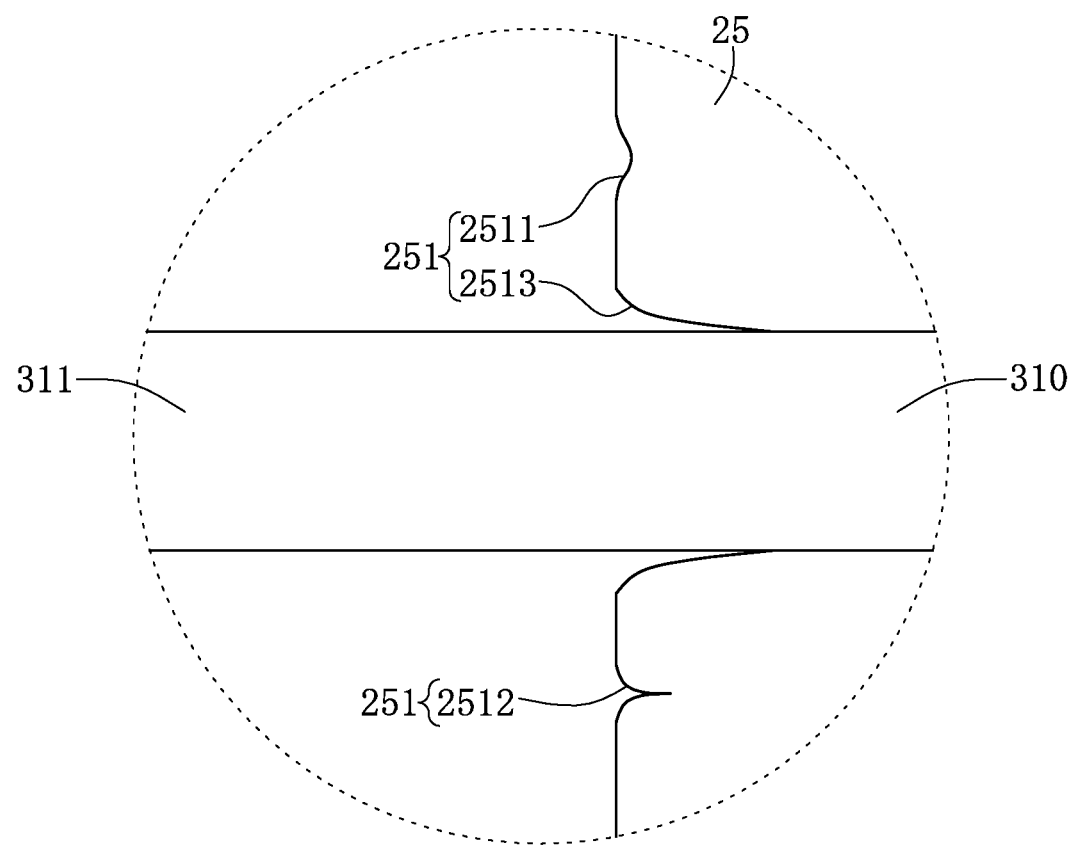
FIG. 4A is a partial enlargement of part A in FIG. 3A.
Figure 4B:
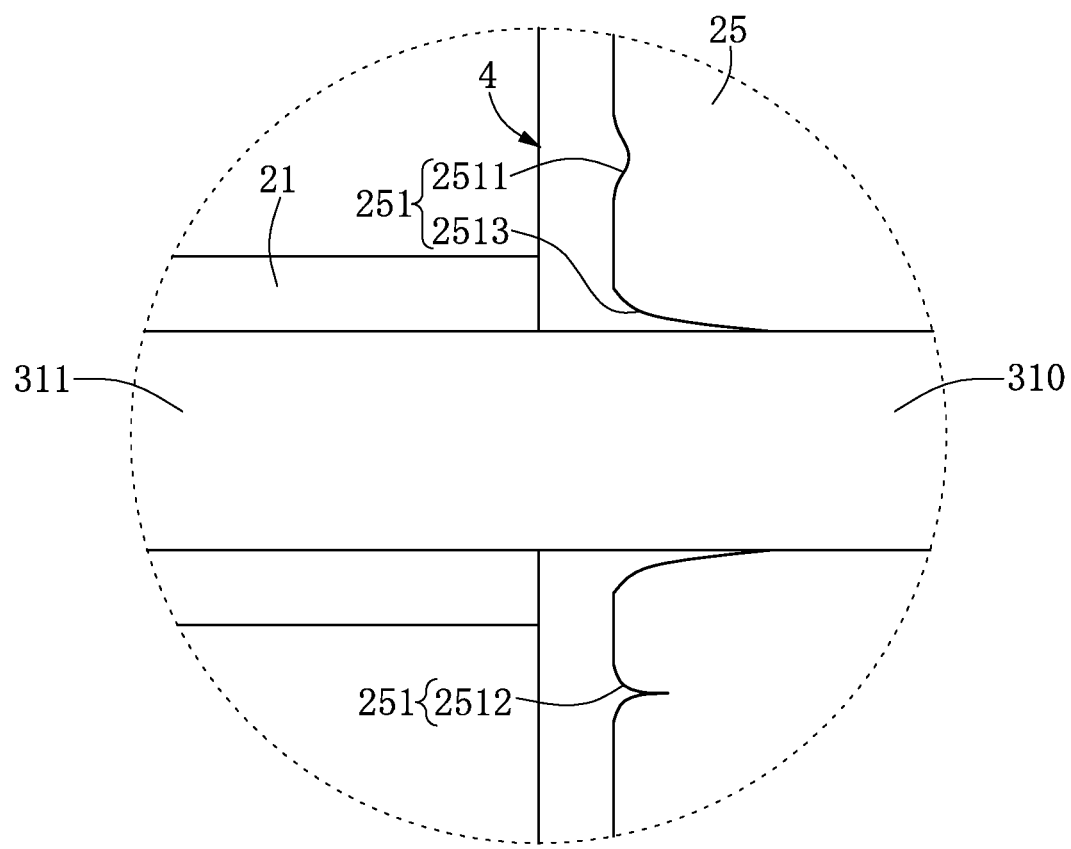
FIG. 4B is a partial enlargement of part B in FIG. 3B.

First, please refer to FIG. 2 to FIG. 4. FIGS. 2A and 2B are the flow charts of the method for manufacturing a solid electrolytic capacitor package structure of the embodiment of the instant disclosure. FIG. 3A to 3C are the schematic views of the solid electrolytic capacitor package structure under different stages during the method for manufacturing a solid electrolytic capacitor package structure of the embodiment of the instant disclosure. FIG. 4A is a partial enlargement of part A in FIG. 3A, and FIG. 4B is a partial enlargement of part B in FIG. 3B. As shown in FIG. 3A, the solid electrolytic capacitor package structure 200 comprises a capacitor assembly 2, an electrode pin 3 electrically connected to the capacitor assembly 2 and a package body 25 enclosing the capacitor assembly 2 and a part of the electrode pin 3. The electrode pin 3 has embedded portions 310, 320 enclosed by the package body 25 and exposed portions 311, 321 outside the package body 25. The method for manufacturing a solid electrolytic capacitor package structure provided by the instant disclosure comprises the following steps.

First, please refer to FIG. 3B, performing a pre-treatment step for forming an electrode pin protective film 21 to enclose the exposed portions 311, 321 of the electrode pin 3 (step S100). The capacitor assembly 2 of the embodiment of the instant disclosure comprises a plurality of chip capacitors 20 which are sequentially stacked on one another. However, the capacitors that constitute the capacitor assembly 2 are not limited thereto. In other words, the capacitor assembly may be constituted by a plurality of wound capacitors. The solid electrolytic capacitor package structure 200 comprises two electrode pins 3. To be specific, the solid electrolytic capacitor package structure 200 comprises a positive pin 31 and a negative pin 32. The positive pin 31 is electrically connected to a plurality of positive connecting pins 22 extending from the front end of the positive portion P of the capacitor assembly 2, and the negative pin 32 is electrically connected to the negative portion N of the capacitor assembly 2. In addition, the positive pin 31 comprises an embedded portion 310 enclosed by the package body 25 and an exposed portion 321 outside the package body 25. In step S100, the electrode pin protective film 21 may be a tape formed by polymers and one surface of the tape is adhesive. The formation of the electrode pin protective film 21 may comprise winding and adhering the tape on the surfaces of the exposed portion 311 of the positive pin 31 and the exposed portion 321 of the negative pin 32. However, the instant disclosure is not limited thereto. The purpose of forming the electrode pin protective film 21 is to avoid the nanomaterial used in the following step from depositing on the exposed portions 311, 321 of the electrode pin 3, thereby ensuring the soldering property of the electrode pins 3.

Next, please refer to FIG. 4A and FIG. 4B. Performing a coating step for forming a nanofilm 4 penetrating and sealing a microstructure 251 of the solid electrolytic capacitor package structure 200 (step S102). The nanomaterial of the nanofilm 4 penetrates into the microstructure 251 of the solid electrolytic capacitor package structure 200 (the defect formed during the manufacturing process). For example, the nanomaterial used for forming the nanofilm 4 may be polymers. In the present embodiment, the nanomaterial is parylene. In the present embodiment, the thickness of the nanofilm 4 is less than 1 micron. However, the thickness of the nanofilm 4 may be adjusted according the intended properties of the products or other parameters of the manufacturing process of the solid electrolytic capacitor package structure 200.

Please refer to FIG. 3B. Step S102 comprises heating a plurality of xylene dimers for vaporizing the xylene dimers; pyrolyzing the vaporized xylene dimers for forming a plurality of xylene monomers; and depositing the xylene monomers on the solid electrolytic capacitor package structure 200, wherein the xylene monomers are polymerized and form the nanofilm 4 which is made from parylene. Different from the liquid coating process that is commonly utilized in the existing art, the embodiment of the instant disclosure employs vaporization, pyrolysis and deposition processes to achieve the formation of the nanofilm 4. For example, the vaporization may be carried out under a temperature of from 150 to 170° C., and the pyrolysis may be carried out under a temperature of from 600 to 700° C. The above temperatures may be varied according to the other parameters of the manufacturing process. In addition, the deposition may be carried out by vacuum vapor deposition equipment.

The deposition may be carried out under room temperature, and by accurately controlling the thickness of the nanofilm 4 and the uniformity of the deposition during the deposition process, the deposition process may be applied on objects having complicate structure or shape. Therefore, the deposition process is particularly suitable for the hexahedral micro-elements comprising chip capacitors. In addition, such a deposition process is able to form nanofilms on large surfaces and hence, may reduce the manufacturing cost related thereto. The nanofilm 4 formed by the deposition process would have good moisture-proof and anti-acid/base properties, thereby achieving a solid electrolytic capacitor package structure 200 having excellent lifetime and reliability.

As mentioned above, the deposition process in step S102 may form the nanofilm 4 on the solid electrolytic capacitor package structure 200, and the nanomaterials would penetrate into the microstructures 251 of the solid electrolytic capacitor package structure 200 and provide a sealing effect. For example, as shown in FIG. 4A, the microstructures 251 of the solid electrolytic capacitor package structure 200 comprise a microvoid 2511 and a microgap 2512 formed during the manufacturing process of the package body 25, and microgaps 2513 formed between the electrode pin 3 and the package body 25. To be specific, the nano-scale nanomaterial may fill the microstructures 251 during the process of deposition, and form the nanofilm 4 on the microstructures 251, thereby eliminating the deleterious effects caused by the microstructures 251 and achieving a solid electrolytic capacitor package structure 200 with good air-tight and water-tight properties.

At last, performing a post-treatment step for removing the electrode pin protective film 21 (step S104). The process for carrying out the removal of the electrode pin protective film 21 is not limited in the instant disclosure. For example, when the electrode pin protective film 21 is an adhesive tape, it may be peeled off from the exposed portion 311 of the positive pin 31 and the exposed portion 321 of the negative pin 32 through a machine. Other processes for removing the electrode pin protective film 21 include dissolving the electrode protective film 21 by chemical solvents.

After step 104, the exposed portions 311, 321 may be bent for electrically connecting with other components. The structure of the solid electrolytic capacitor package structure 200 manufactured by the above steps are shown in FIG. 3C.

Based on the method for manufacturing a solid electrolytic capacitor package structure set forth above, the instant disclosure further provides a solid electrolytic capacitor package structure 200 comprising a capacitor assembly 2, at least an electrode pin 3 electrically connected to the capacitor assembly 2; a package body 25 enclosing the capacitor assembly 2 and at least a part of the electrode pin 3, in which the electrode pin 3 has an embedded portion 30 enclosed by the package body 25 and an exposed portion 33 outside the package body 25; and a nanofilm 4 made from a nanomaterial, the nanofilm 4 covers a surface of the package body 25, wherein the nanomaterial seals microvoids 2511 and microgaps 2512 formed on the surface of the package body 25 and microgaps 2513 positioned between the package body 25 and the electrode pin 3.

The method for manufacturing the solid electrolytic capacitor package structure 200 provided by the instant disclosure and the details regarding the material thereof are described above, and hence, are not discussed in detail here.

Possible Effectiveness of the Embodiments

The advantages of the instant disclosure reside in that the solid electrolytic capacitor package structure and method of manufacturing the same include the design of "forming a nanofilm that penetrates and seals the microstructures of the solid electrolytic capacitor package structure", and hence, it would be able to ensure the air-tight, water-tight and acid/base resistance properties of the solid electrolytic capacitor package structure, thereby increasing the lifetime thereof. For example, the solid electrolytic capacitor package structure provided by the embodiment of the instant disclosure may pass high temperature high humidity tests such as 1000 hrs under 60° C/90%, 500 hrs under 85° C/85%, and may pass a thermal shock test for 1000 hrs under −55° C.~125° C. as well.

The above-mentioned descriptions represent merely the exemplary embodiment of the instant disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A method for manufacturing a solid electrolytic capacitor package structure, wherein the solid electrolytic capacitor package structure comprises a capacitor assembly, at least one electrode pin electrically connected to the capacitor assembly and a package body enclosing the capacitor assembly and at least a part of the electrode pin, and the electrode pin has an embedded portion enclosed by the package body and an exposed portion positioned outside the package body, the method for manufacturing the electrolytic capacitor package structure comprises:

performing a pre-treatment step for forming an electrode pin protective film to enclose the exposed portion of the electrode pin;

performing a coating step for forming a nanofilm penetrating and sealing a microstructure of the solid electrolytic capacitor package structure; and performing a post-treatment step for removing the electrode pin protective film.

2. The method according to claim 1, wherein the nanofilm is made from parylene.

3. The method according to claim 1, wherein performing the coating step comprises:

heating a plurality of xylene dimers for vaporizing the xylene dimers;

pyrolyzing the vaporized xylene dimers for forming a plurality of xylene monomers; and depositing the xylene monomers on the solid electrolytic capacitor package structure, wherein the xylene monomers are polymerized and form the nanofilm which is made from parylene.

4. The method according to claim 3, wherein the step of depositing the xylene monomers is carried out in a vacuum vapor deposition equipment under room temperature.

5. The method according to claim 1, wherein the nanofilm has a thickness of less than 1 micrometer.

6. The method according to claim 1, wherein the capacitor assembly comprises a plurality of chip capacitors which are sequentially stacked or a wound capacitor.

7. The method according to claim 1, wherein the microstructure of the solid electrolytic capacitor package structure comprises a microvoid or a microgap formed during a manufacturing process of the package body and a microvoid positioned between the electrode pin and the package body.

8. A solid electrolytic capacitor package structure comprising:

an capacitor assembly;

at least an electrode pin electrically connected to the capacitor assembly;

a package body enclosing the capacitor assembly and at least a part of the electrode pin, wherein the electrode pin has an embedded portion enclosed by the package body and an exposed portion outside the package body; and a nanofilm made from a nanomaterial, the nanofilm covers a surface of the package body, wherein the nanomaterial seals a microvoid and a microgap formed on the surface of the package body and a microgap positioned between the package body and the electrode pin.

9. The solid electrolytic capacitor package structure according to claim 8, wherein the nanomaterial is paralyne.

10. The solid electrolytic capacitor package structure according to claim 8, wherein the capacitor assembly comprises a plurality of chip capacitors which are sequentially stacked or a wound capacitor.

* * * * *